United States Patent [19]
Goralski

[11] 3,896,122
[45] July 22, 1975

[54] MORPHOLINE DERIVATIVES OF 3,4,5-TRICHLORO-2,6-PYRIDINEDICARBONITRILE

[75] Inventor: Christian T. Goralski, Midland, Mich.

[73] Assignee: The Dow Chemical Company, Midland, Mich.

[22] Filed: July 2, 1973

[21] Appl. No.: 375,415

[52] U.S. Cl............................ 260/247.5 G; 424/248
[51] Int. Cl.............................................. C07d 87/40
[58] Field of Search.............................. 260/247.5 G

[56] References Cited
FOREIGN PATENTS OR APPLICATIONS
1,958,595  11/1970  Germany............................ 260/250

*Primary Examiner*—Anton H. Sutto
*Assistant Examiner*—Richard D. Kelly
*Attorney, Agent, or Firm*—Theodore Post; C. Kenneth Bjork

[57] ABSTRACT

3,4-Dichloro-5-(4-morpholinyl)-2,6-pyridinedicarbonitrile;3,5-dichloro-4-(4-morpholinyl)-2,6-pyridinedicarbonitrile; and mixtures thereof are prepared by mixing 3,4,5-trichloro-2,6-pyridinedicarbonitrile with morpholine at room temperature to form the subject compounds and mixtures thereof. The compounds have fungicidal activity.

3 Claims, No Drawings

MORPHOLINE DERIVATIVES OF 3,4,5-TRICHLORO-2,6-PYRIDINEDICARBONITRILE

BACKGROUND OF THE INVENTION 2,6-Dicyanotrichloropyridine is known to have fungicidal activity; U.S. Pat. No. 3,549,762.

SUMMARY OF THE INVENTION

This invention concerns the new compounds 3,4-dichloro-5-(4-morpholinyl)-2,6-pyridinedicarbonitrile; the isomeric 3,5-dichloro-4-(4-morpholinyl)-2,6-pyridinedicarbonitrile; and mixtures thereof. The compounds and mixtures thereof are bright yellow crystalline materials which have a high melting point and are soluble in hydrophobic solvents such as methylene chloride, chloroform, and other chlorinated solvents.

The compounds and their mixtures are prepared by mixing at room temperature 3,4,5-trichloro-2,6-pyridinedicarbonitrile with excess of morpholine, advantageously about 2 molar proportions of morpholine per molar proportion of the trichloro-2,6-pyridinedicarbonitrile in the presence of a liquid monohydric alcohol such as methanol or ethanol as reaction medium. The excess of morpholine acts as an acid acceptor to bind the liberated hydrogen chloride of reaction. The reaction proceeds at room temperature and can be followed by the formation of morpholine hydrochloride by-product. The reaction is complete when no more by-product morpholine hydrochloride is formed. The isomeric mixed product of reaction is separated into its components by chromatographic methods, if desired. However, since both isomers have substantially equal fungicidal activity, as would be expected, the commercial mixture as formed is useful as such.

DESCRIPTION OF THE PREFERRED EMBODIMENTS

The following example additionally describes a specific embodiment and the best mode contemplated by the inventor of carrying out the invention.

EXAMPLE 3,4(and 5)-Dichloro-5(and 4)-(4-morpholinyl)-2,6-pyridinedicarbonitrile In a 500 ml., three-neck flask equipped with a magnetic stirrer and a reflux condenser fitted with a calcium chloride drying tube were placed 9.28 g. (0.04 mol) of 3,4,5-trichloro-2,6-pyridine-dicarbonitrile, 350 ml. of methanol and 7.00 g. (0.08 mol) of morpholine. The reaction mixture was allowed to stir at room temperature for four hours. A bright-yellow solid formed and was suspended in the methanol. The solid was filtered off and vacuum dried to give 7.12 g. of small, bright yellow crystals, m.p. 140°–152°C.

Anal. Calcd. for $C_{11}H_8Cl_2N_4O$: C, 46.66; H, 2.85; Cl, 25.05; N, 19.79. Found: ;C, 46.61; H, 2.91; Cl, 25.21; N, 20.17.

The methanol was removed in vacuo from the filtrate leaving a yellow solid. The solid was slurried in water and filtered off. The solid was air-dried and vacuum dried to give a second crop of 3.20 g. having a different isomer distribution, m.p. 114°–138°C. The individual compounds of the mixtures are separated by chromatographic methods. The structure of the compounds are assigned by carbon-13 nuclear magnetic resonance spectroscopy.

The products of the invention are useful as antimicrobials for the control of fungi. This is not to suggest that the compounds of this invention and their mixtures are equally effective against all such organisms at the same concentration. For such uses the compounds or their isomeric mixtures can be employed in an unmodified form or dispersed on a finely divided solid and employed as dusts. Such mixtures can also be dispersed in water with the aid of a surface-active agent and the resulting emulsions employed as sprays. In other procedures, the products can be employed as active constituents in solvent solutions, oil-in-water or water-in-oil emulsions. The augmented compositions are adapted to be formulated as concentrates and subsequently diluted with additional liquid or solid adjuvant to produce the ultimate treating compositions. Good results are obtained when employing compositions containing fungicidal concentrations and usually from about 100 to about 1,000 parts by weight of one or more of the compounds per million parts of such compositions.

Incorporation of the compounds of this invention into materials which are subject to fungal attack inhibits the growth of the fungi and preserves the original value of the materials. The compounds are sufficiently non-volatile and water-insoluble that they will persist on or in such materials for long periods of time. Examples of materials which are adversely effected by fungal growth are latex and alkyd paint films, wood and wooden products. The inventive compounds are sufficiently active against fungi that only small quantities are required to prevent mildew on paint films or wood rot. The compounds are therefore useful for long-term protection against fungal growth in or on materials having a wood basis or a protective or decorative paint film subject to fungal attack.

In representative operations, the product of the Example when tested for fungicidal activity using conventional agar dilution tests gave complete growth inhibition against *Candida albicans*, *Tricophyton mentagrophytes*, *Aspergillus terreus*, *Candida pelliculosa*, *Pullularia pullulans*, *Mycobacterium phlei*, *Rhizopus nigricans*, *Ceratocystis ips*, *Cephaloascus fragans* and *Trichoderm Species* Madison P-42 at a concentration of 100 parts per million against all of the stated organisms except *Trichophyton mentagrophytes*, wherein complete growth inhibition was had at a concentration of 10 parts per million.

What is claimed is:

1. A compound selected from the group consisting of 3,4-dichloro-5-(4-morpholinyl)-2,6-pyridinedicarbonitrile and 3,5-dichloro-4-(4-morpholinyl)-2,6-pyridinedicarbonitrile.

2. The compound of claim 1 which is 3,4-dichloro-5-(4-morpholinyl)-2,6-pyridinedicarbonitrile.

3. The compound of claim 1 which is 3,5-dichloro-4-(4-morpholinyl)-2,6-pyridinedicarbonitrile.

* * * * *